United States Patent
Shimizu

(10) Patent No.: US 11,514,169 B2
(45) Date of Patent: Nov. 29, 2022

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Shota Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 539 days.

(21) Appl. No.: 16/560,868

(22) Filed: Sep. 4, 2019

(65) Prior Publication Data
US 2020/0082093 A1 Mar. 12, 2020

(30) Foreign Application Priority Data

Sep. 12, 2018 (JP) .............................. JP2018-170613

(51) Int. Cl.
*G06F 21/57* (2013.01)
*G06F 9/4401* (2018.01)
(Continued)

(52) U.S. Cl.
CPC ............ *G06F 21/575* (2013.01); *G06F 3/123* (2013.01); *G06F 3/1222* (2013.01);
(Continued)

(58) Field of Classification Search
CPC ...... G06F 21/575; G06F 3/1222; G06F 3/123; G06F 3/1254; G06F 9/441; G06F 9/445
See application file for complete search history.

(56) References Cited

U.S. PATENT DOCUMENTS

| 7,334,157 B1 * | 2/2008 | Graf ...................... G06F 9/4411 |
| | | 714/E11.122 |
| 9,306,980 B2 | 4/2016 | Shimizu ............. H04N 1/00875 |

(Continued)

FOREIGN PATENT DOCUMENTS

| JP | H06-66751 B2 | 8/1994 |
| JP | 2014-032595 | 2/2014 |

(Continued)

OTHER PUBLICATIONS

Office Action dated Apr. 28, 2022 in counterpart Korean Application No. 10-2019-0106265, together with English translation thereof.

*Primary Examiner* — Ji H Bae
*Assistant Examiner* — Hyun Soo Kim
(74) *Attorney, Agent, or Firm* — Venable LLP

(57) ABSTRACT

Provided is an information processing apparatus that performs alteration detection processing on every occasion of starting a program, comprising a writing component capable of writing a setting indicating whether or not to perform the alteration detection processing to a first region referable by a first program that firstly performs the alteration detection processing on another program and to a second region not referable by the first program at a point when the first program is started. The first program performs the alteration detection processing in accordance with the setting written in the first region, and a second program capable of referring to the second region performs the alteration detection processing in accordance with the setting written in the second region.

10 Claims, 7 Drawing Sheets

(51) Int. Cl.
*G06F 3/12* (2006.01)
*G06F 9/445* (2018.01)

(52) U.S. Cl.
CPC ............ *G06F 3/1254* (2013.01); *G06F 9/441* (2013.01); *G06F 9/445* (2013.01)

(56) References Cited

U.S. PATENT DOCUMENTS

| | | | |
|---|---|---|---|
| 9,367,692 B2 | 6/2016 | Brown et al. | G06F 21/71 |
| 10,567,435 B2 | 2/2020 | Shimizu | G06F 21/00 |
| 2010/0185845 A1 | 7/2010 | Takayama et al. | 713/2 |
| 2014/0040636 A1 | 2/2014 | Jeansonne et al. | 713/189 |
| 2017/0230422 A1* | 8/2017 | Shimizu | G06F 21/00 |
| 2019/0114429 A1 | 4/2019 | Shimizu | G06F 21/575 |
| 2020/0410104 A1* | 12/2020 | Zimmermann | G06F 21/575 |

FOREIGN PATENT DOCUMENTS

| | | |
|---|---|---|
| JP | 2017-138883 | 8/2017 |
| KR | 10-2014-0068867 | 6/2014 |
| WO | 2009/044533 | 4/2009 |

* cited by examiner

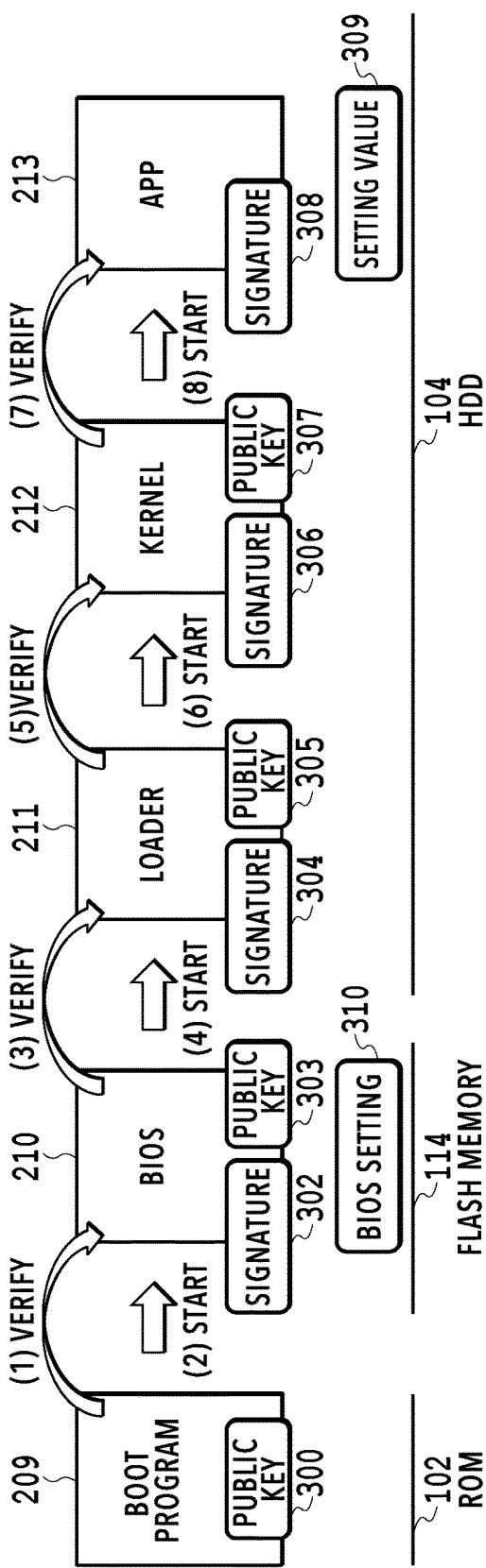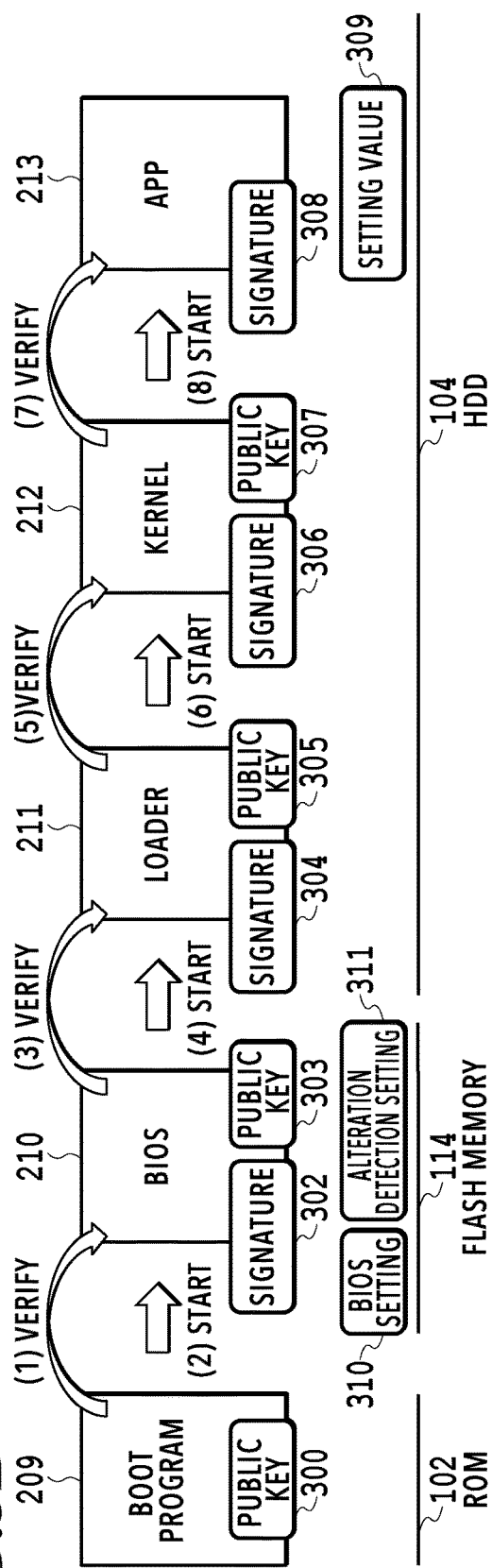

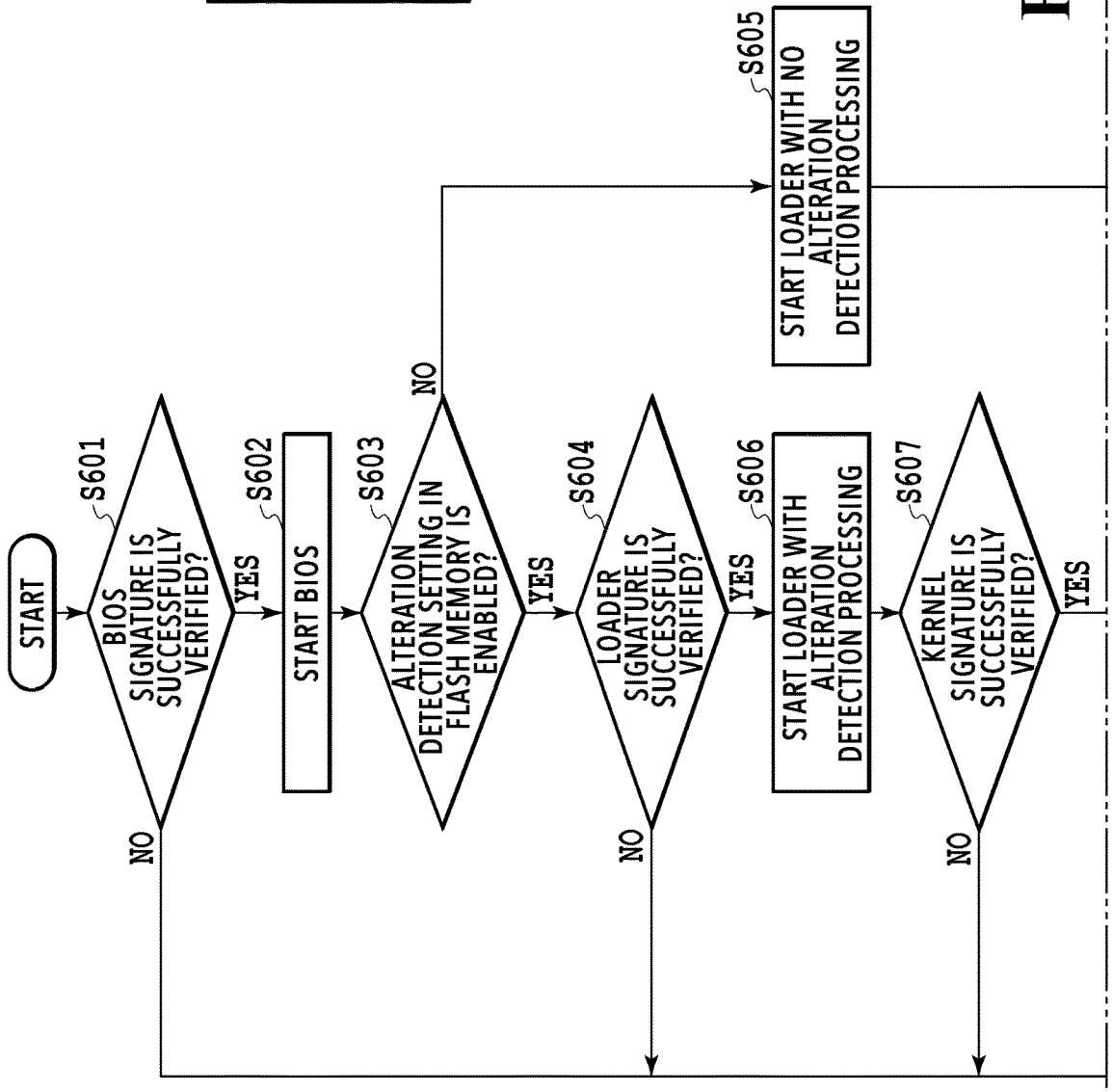

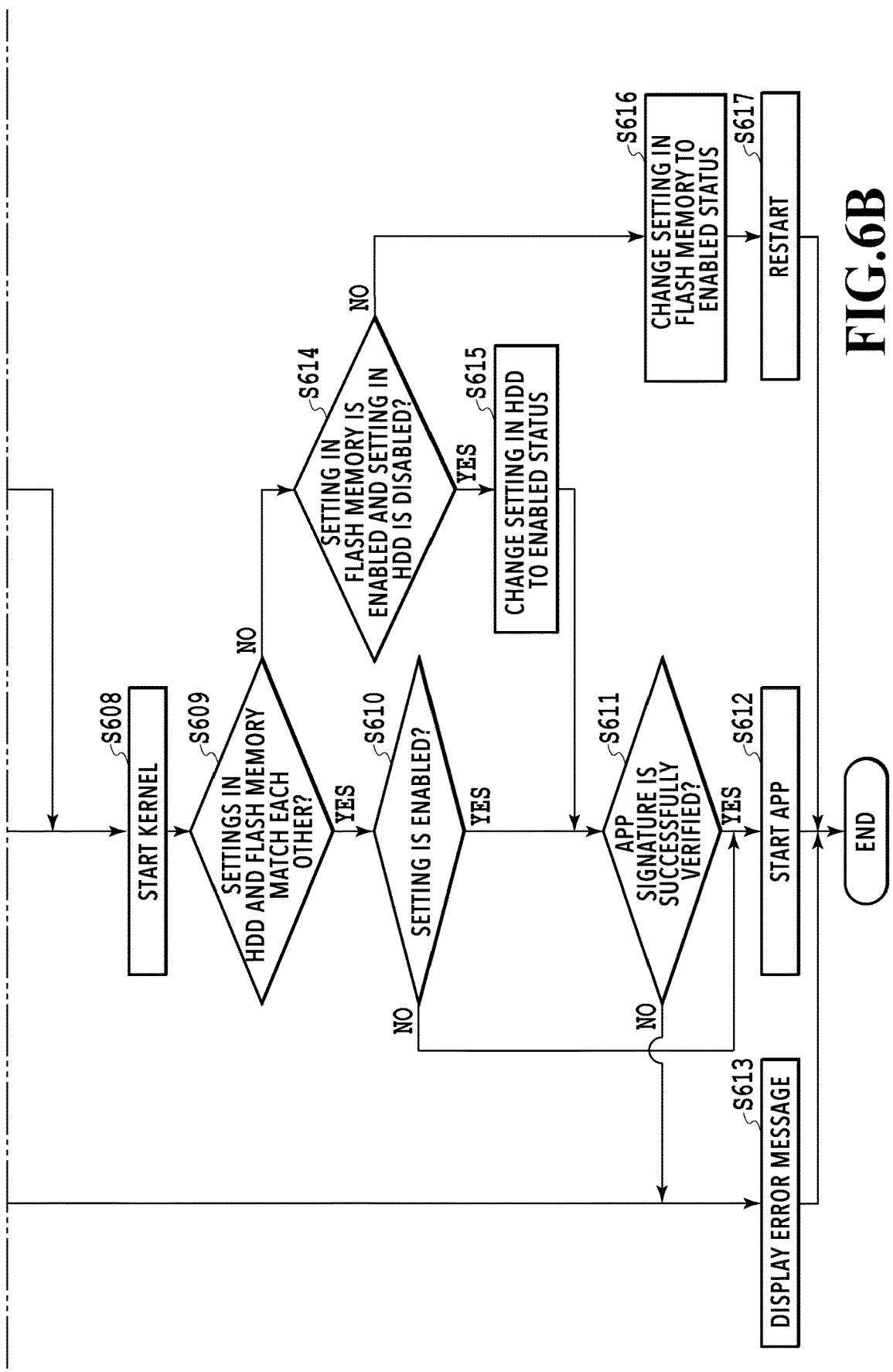

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to a technique of information processing capable of detecting an alteration.

Description of the Related Art

There have been issues of attacks that exploit computers by altering programs through the programs' vulnerabilities. International Laid-Open No. 2009/044533 (hereinafter referred to as document 1) discloses a technique of detecting an alteration of a program. Specifically, document 1 discloses a technique of detecting an alteration of a program by using an anti-tamper module such that the hash value of the program is calculated and stored, and, each time the program is started, the hash value of the program is recalculated and a verification is performed.

Here, in the technique of document 1, the alteration detection processing is executed without exception. For this reason, users who, for example, prioritize start speed over alteration detection, have to go through a situation where start processing takes time.

SUMMARY OF THE INVENTION

An information processing apparatus according to an aspect of the present invention is an information processing apparatus that performs alteration detection processing on every occasion of starting a program, comprising a writing component capable of writing a setting indicating whether or not to perform the alteration detection processing to a first region referable by a first program that firstly performs the alteration detection processing on another program and to a second region not referable by the first program at a point when the first program is started. The first program performs the alteration detection processing in accordance with the setting written in the first region, and a second program capable of referring to the second region performs the alteration detection processing in accordance with the setting written in the second region.

Further features of the present invention will become apparent from the following description of exemplary embodiments with reference to the attached drawings.

BRIEF DESCRIPTION OF THE DRAWINGS

FIGS. 3A and 3B are schematic diagrams each showing a series of operations in start up;

FIG. 6 is a diagram showing the relationship of FIGS. 6A and 6B; and

FIGS. 6A and 6B are a flowchart showing alteration detection processing.

DESCRIPTION OF THE EMBODIMENTS

Figure 1:
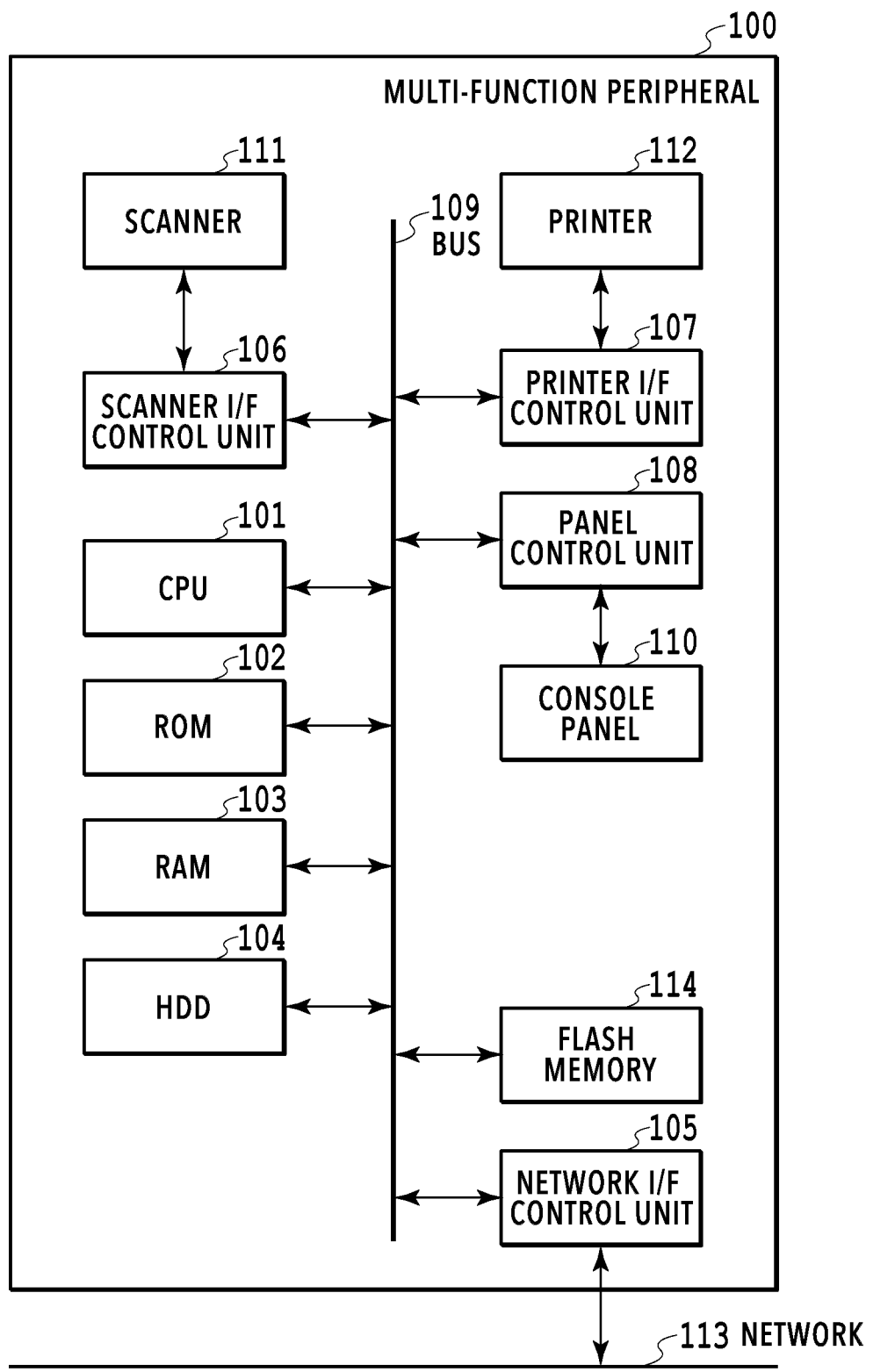
FIG. 1 is a hardware configuration diagram of a multi-function peripheral.

An embodiment of the present invention will be specifically described below with reference to the accompanying drawings. Note that the following embodiment does not limit the present invention according to the claims, and not all the combinations of the features described in the embodiment are necessarily essential for solving the problem to be solved by the present invention. Note that the following embodiment will be described by taking a multi-function peripheral (MFP) as an example of an information processing apparatus. However, the embodiment is not limited to a multi-function peripheral, but any type of information processing apparatus can be used.

Embodiment 1

Prior to describing the configuration of an information processing apparatus in the present embodiment, an overview of alteration detection processing will be described. Starting an information processing apparatus generally involves starting a plurality of programs in turn. For example, programs such as a boot program, a BIOS, a loader, a kernel, and an application are started in this order on a stage-by-stage basis. The boot program, the BIOS, the loader, the kernel, and the application are separate programs. Each program to be started by another program stores a signature. In starting each program, alteration detection processing is performed by performing a signature verification, and starting the program only if the signature is successfully verified.

Thus, in the case of executing alteration detection processing, verification processing is performed in addition to usual start processing. This increases the time taken to complete starting the information processing apparatus. To address this, there is a conceivable configuration that sets and controls whether to enable (ON) or disable (OFF) of execution of the alteration detection processing by means of an application, since there are also users who wish to skip the alteration detection processing and quickly start the information processing apparatus.

Here, assume a configuration in which setting information on whether to enable or disable the alteration detection processing is stored in a storage region (e.g., a storage region in an HDD) generally used by the application (hereinafter referred to as "app"). In this case, the programs started at the stages preceding the stage at which the app is started cannot refer to the above information. For example, the start processing of the BIOS and the loader is performed in a state where the minimum necessary hardware is available. For this reason, the BIOS and the loader cannot refer to the setting information on whether to enable or disable the alteration detection processing in the case where the setting information is stored in a storage region generally used by the app (e.g., a storage region in an HDD). Consequently, a verification must always be performed on each of the BIOS, the loader, and the kernel to ensure security, which slows down the start up even with the setting information set to a disabled (OFF) status.

Meanwhile, there is also a conceivable method in which the setting information on whether to enable or disable the alteration detection is stored in a storage region that can be used from the BIOS and so on. However, in the case of storing the setting information in a storage region that can be used from the BIOS and so on, the setting information needs to be managed separately from the original setting information managed by the app. For example, in backup and restoration, separate procedures are needed, thereby making the management complicated.

In the embodiment to be described below, a description will be given of a configuration capable of switching between executing and not executing alteration detection processing by appropriately setting whether the alteration detection processing is enabled or disabled. Also, a description will be given of a configuration capable of skipping verification processing and thereby achieving quick start in a case where setting information on whether to enable or disable execution of alteration detection processing is set to a disabled status, by redundantly storing the setting information in different storage regions. Also, a description will be given of a configuration that makes management easier by redundantly storing the setting information in different storage regions.

<Hardware Configuration>

FIG. 1 is a block diagram explaining the hardware configuration of a multi-function peripheral 100. The multi-function peripheral 100 comprises a CPU 101, an ROM 102, an RAM 103, an HDD 104, a network I/F control unit 105, a scanner I/F control unit 106, a printer I/F control unit 107, and a panel control unit 108. The multi-function peripheral 100 also comprises a console panel 110, a scanner 111, a printer 112, and a flash memory 114.

The CPU 101 executes various software programs to control the whole apparatus. The ROM 102 is a read-only memory. The ROM 102 stores a boot program which is the first program to be directly loaded and executed by the CPU 101 upon powering on the multi-function peripheral 100.

The RAM 103 is a random-access memory. The RAM 103 is used by the CPU 101 for storage of programs and temporary data and so on during control of the multi-function peripheral 100. In the present specification, loading of a program into the RAM 103 and execution of the program by the CPU 101 will be expressed as "starting" a program, unless otherwise noted.

The flash memory 114 is a non-volatile memory. The flash memory 114 stores a BIOS which is a program to be started by the boot program, and a BIOS setting which is setting information to be referred to by the BIOS. The HDD 104 stores a loader, a kernel, and an application (app), which are programs.

The network I/F control unit 105 controls transmission and reception of data to and from external equipment through a network 113. The scanner I/F control unit 106 controls scanning of documents by the scanner 111. The printer I/F control unit 107 controls print processing and the like by the printer 112. The panel control unit 108 controls the touchscreen-type console panel 110 to controls display of various pieces of information and input of instructions from users.

The bus 109 connects the CPU 101, the ROM 102, the RAM 103, the HDD 104, the network I/F control unit 105, the scanner I/F control unit 106, the printer I/F control unit 107, the panel control unit 108, and the flash memory 114 to each other. Control signals from the CPU 101 and data signals between devices are transmitted and received through the bus 109.

<Software Module>

Figure 2:
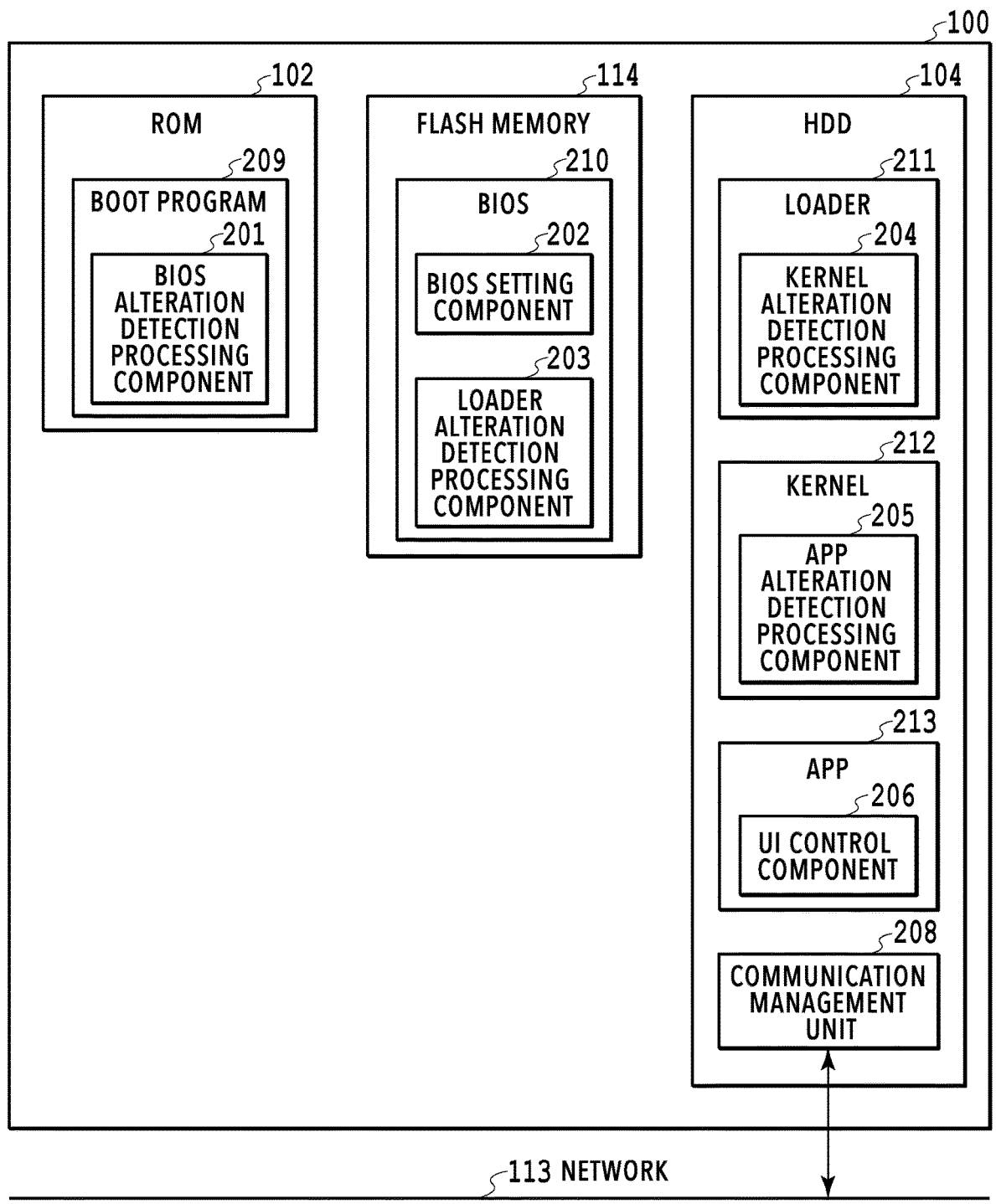
FIG. 2 is a software configuration diagram of the multi-function peripheral.

FIG. 2 is a block diagram explaining software modules included in the multi-function peripheral 100. Pieces of hardware storing the software modules are shown as well. The multi-function peripheral 100 comprises a boot program 209, a BIOS 210, a loader 211, a kernel 212, an app 213, and a communication management unit 208. The boot program 209 is stored in the ROM 102. The BIOS 210 is stored in the flash memory 114. The loader 211, the kernel 212, the app 213, and the communication management unit 208 are stored in the HDD 104.

The boot program 209 has a BIOS alteration detection processing component 201. The BIOS 210 has a BIOS setting component 202 and a loader alteration detection processing component 203. The loader 211 has a kernel alteration detection processing component 204. The kernel 212 has an app alteration detection processing component 205. The app 213 has a UI control component 206. Upon starting each program, the CPU 101 functions as the detection processing component stored in the program.

The communication management unit 208 controls the network I/F control unit 105, connected to the network 113, to transmit and receive data to and from external equipment. The UI control component 206 receives an input directed to the console panel 110 through the panel control unit 108, and performs processing corresponding to the input and outputs a screen to the console panel 110.

The boot program 209 is a program to be executed by the CPU 101 upon powering on the multi-function peripheral 100. The CPU 101 performs processing related to start up in accordance with the boot program 209. Also, the boot program 209 has the BIOS alteration detection processing component 201, which performs alteration detection processing for the BIOS 210.

The BIOS 210 is a program to be started by the boot program 209. The BIOS 210 is a program that performs processing related to start up such as hardware initialization. The BIOS 210 has the BIOS setting component 202, which handles settings related to this start processing, and the loader alteration detection processing component 203, which performs alteration detection processing for the loader 211. Note that at the point when the BIOS 210 is started, the kernel 212 is yet to be started and therefore a driver (described later) for accessing the HDD 104 is not present yet. Hence, the BIOS 210 can only access the predetermined region storing the loader 211 among regions in the HDD 104.

The loader 211 is a program to be started by the BIOS 210. The loader 211 is a program which performs processing of selecting and starting the kernel 212. The loader 211 has the kernel alteration detection processing component 204, which performs alteration detection processing for the kernel 212.

The kernel 212 is a program to be started by the loader 211. The kernel 212 loads various drivers and assists the operation of the app 213. Each driver has a function that enables the app 213 to access and use the CPU 101, the RAM 103, or the HDD 104, which is hardware. Further, the kernel 212 has the app alteration detection processing component 205, which performs alteration detection processing for the app 213.

The app 213 is a program to be started by the kernel 212. For instance, the UI control component 206, which controls the panel control unit 108 and the console panel 110 to receive user operations on the multi-function peripheral 100, is an example of the app 213. Note that the app 213 is not limited to this example. For example, the app 213 also includes an app having a printing function that prints print data received by the network I/F control unit 105 from the network 113 by using the printer I/F control unit 107 and the printer 112. There can be other apps that execute functions of the multi-function peripheral, but description of these apps is omitted here.

<Flow of Start Operation>

FIGS. 3A and 3B are schematic diagrams each explaining processing for operation of each program in starting of the multi-function peripheral 100. FIG. 3A is a diagram showing a comparative example representing a case where the HDD 104 stores a setting value (setting information) for switching between enabling and disabling execution of alteration detection processing. Firstly, a description will be given of processing of starting the programs, namely the boot program 209, the BIOS 210, the loader 211, the kernel 212, and the app 213, in this order with reference to FIG. 3A. Also, a description will be given of the flow of processing of starting the programs on a stage-by-stage basis with each program performing alteration detection processing on the program to be started at the next stage. Note that FIG. 3A also shows the pieces of hardware storing the programs, digital signatures (hereinafter referred to as "signatures"), public keys, and a setting value.

The boot program 209 contains a BIOS verification public key 300. The BIOS 210 contains a BIOS signature 302 and a loader verification public key 303. The flash memory 114 stores a BIOS setting 310 which is information indicating an operation setting for the BIOS 210, in a region other than the region for the BIOS 210. Examples of the BIOS setting include a setting which, in a case where a plurality of storage devices are connected, indicates the storage device to be preferentially read and started, and the like. In the present embodiment, a description will be given on the assumption that the BIOS setting 310 is defined to preferentially read and start the HDD 104.

The loader 211 contains a loader signature 304 and a kernel verification public key 305. The kernel 212 contains a kernel signature 306 and an app verification public key 307. The app 213 contains an app signature 308. The HDD 104 also stores a setting value 309 to be used from the app 213. Note that the public keys and the signatures in the programs are given to the programs in advance before the shipment of the multi-function peripheral 100.

As shown in FIGS. 2 and 3A, each detection processing component of the BIOS alteration detection processing component 201, the loader alteration detection processing component 203, the kernel alteration detection processing component 204, and the app alteration detection processing component 205 performs a verification on the signature of the program to be started next. The next program is started in a case where the verification is passed. By performing such processing, the multi-function peripheral 100 is started with alteration detection processing performed on a stage-by-stage basis. The multi-function peripheral 100, configured to be started with alteration detection processing performed in the above manner, handles a larger amount of processing and therefore takes longer time to be started than a multi-function peripheral that performs no alteration detection processing.

Some users of the multi-function peripheral 100 prefer a shorter start time over the improved security achieved by the alteration detection processing. For this reason, it is desirable that enabling and disabling of the alteration detection function can be switched by a setting selected by the user.

Figure 4:
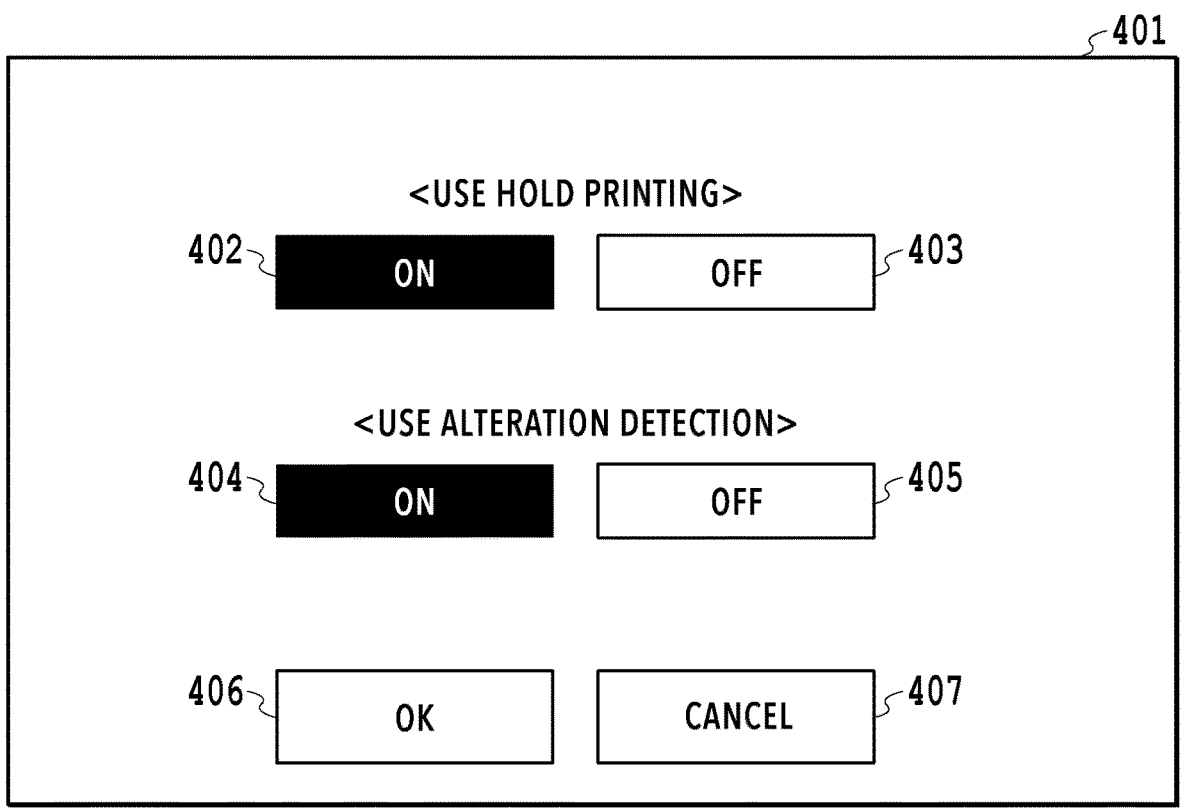
FIG. 4 is a schematic diagram showing a setting screen.

FIG. 4 is a schematic diagram of a setting screen 401 of the multi-function peripheral 100 displayed on the console panel 110 by the UI control component 206. A button 402 and a button 403 are buttons for selecting whether to enable or disable a hold printing function. The hold printing function is a function, among the printing functions of the multi-function peripheral, of printing print data received by the network I/F control unit 105 with the printer 112 only if instructed by the UI control component 206 to print the print data, instead of immediately printing the print data.

A button 404 and a button 405 are buttons for selecting whether to enable or disable the alteration detection function of the multi-function peripheral 100. Selecting a button 406 stores the setting contents on the set setting screen 401 into the HDD 104. Selecting a button 407 cancels the contents selected on the setting screen 401.

The contents selected on the setting screen 401 are stored in the HDD 104 as the setting value 309 shown in FIG. 3A. The setting value 309 is used by functions of the app 213. For the app 213, the management of the setting value 309 will be easier if the setting value 309 is stored in the same storage device as that for the app 213 (HDD 104). This is because the app 213 can handle the setting value 309 with the same access interface, for example. Moreover, the management of the setting value 309 will be easier in a case of performing back up processing and restoration processing. For this reason, the setting value 309 is stored in the HDD 104, which is the same storage device as that for the app 213.

The UI control component 206 displays the setting screen 401 by reading the setting value 309 in the HDD 104 and displaying the current setting contents. The example of FIG. 4 shows a case where the setting screen 401 is displayed with the button 402 and the button 404 selected. Specifically, the example of FIG. 4 shows that the contents selected with the button 402 and the button 404 are the current setting contents set as the setting value 309. FIG. 4 explains a configuration in which a setting value on use of the hold printing and a setting value on use of the alteration detection are set on the same setting screen 401. However, the configuration may be such that each setting value is set on a different screen. Also, the configuration may be such that other setting values are set on the same screen.

As described above, it is possible for a user to switch between enabling and disabling of execution of the alteration detection processing if the setting information on use of the alteration detection processing (setting value 309) is stored in the HDD 104 and the user can change the setting information. However, the driver for accessing the setting value 309 in the HDD 104 is yet to be loaded at the point when the BIOS 210 and the loader 211 are started. The driver for accessing the HDD 104 is loaded by starting the kernel 212. Hence, the BIOS 210 and the loader 211 cannot obtain the setting value 309. It is therefore impossible to switch between enabling and disabling the alteration detection processing. In FIG. 3A, switching between enabling and disabling of the alteration detection processing by referring to the setting value 309 is possible from the kernel 212, which is configured to enable the driver.

In sum, even if the multi-function peripheral 100 with an alteration detection function as shown in FIG. 3A disables the alteration detection function, the multi-function peripheral 100 cannot achieve a substantially equal start time to the start time of a multi-function peripheral with no alteration detection function. Meanwhile, if the flash memory 114 stores the setting for the alteration detection processing, the app 213 cannot handle the setting with the same access interface as that for other setting values, as mentioned earlier. Hence, it will be necessary to perform special processing in the case of performing back up and restoration. Accordingly, the management of the setting values will be complicated.

FIG. 3B is a schematic diagram explaining processing for operation of each program in starting of the multi-function peripheral 100 in the present embodiment. In FIG. 3B, the flash memory 114 stores an alteration detection setting 311

(setting information) in a region other than the regions for the BIOS 210 and the BIOS setting 310. The alteration detection setting 311 is setting information indicating whether to enable or disable alteration detection processing, and is synchronized with the setting value 309. Whether or not to execute the alteration detection processing by each of the BIOS 210 and the loader 211 ((3) VERIFICATION and (5) VERIFICATION in FIG. 3A) is switched in accordance with the content of the alteration detection setting 311. The other contents in FIG. 3B are the same as those described with FIG. 3A. In the present embodiment, a setting indicating whether or not to execute the alteration detection processing is stored in a plurality of storage regions in synchronization with each other. In this way, whether or not to execute the alteration detection processing can be switched without making the management complicated. Moreover, disabling the alteration detection function makes the start time shorter than that in the case where the alteration detection processing is performed.

<Flowchart of Changing Alteration Detection Setting>

Figure 5:
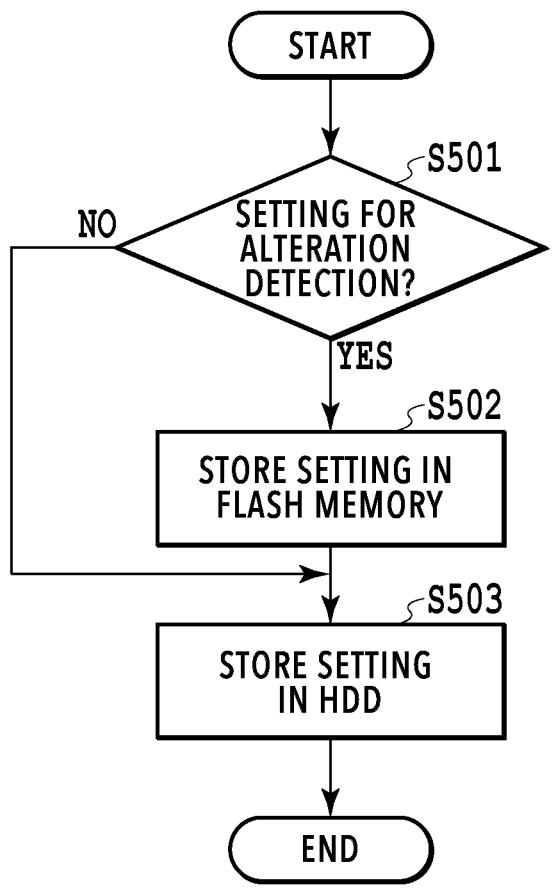
FIG. 5 is a flowchart showing processing performed upon changing a setting.

FIG. 5 is a flowchart explaining processing performed by the UI control component 206 upon changing a setting. The CPU 101 of the multi-function peripheral 100 performs the series of processes shown in the flowchart in FIG. 5 by deploying the program code of the app 213, stored in the HDD 104, into the RAM and executing it. Meanwhile, the symbol "S" in the description of each process means a step in the flowchart.

Upon receipt of a setting change instruction from the console panel 110, the UI control component 206 determines in S501 whether the setting for which the change instruction is received is the setting for the alteration detection. If the setting is not for the alteration detection, the processing proceeds to S503. Then in S503, the UI control component 206 stores the content of the change in the setting value 309 in the HDD 104, and ends the processing.

On the other hand, if it is determined in S501 that the setting is for the alteration detection, the UI control component 206 advances the processing to S502. In S502, the UI control component 206 stores the content of the change in the alteration detection setting as the alteration detection setting 311 in the flash memory 114. Then, the UI control component 206 proceeds to S503 to likewise store the content of the change in the alteration detection setting as part of the setting value 309 in the HDD 104, and ends the processing. In short, the content of the change in the alteration detection setting is written to and stored in both the flash memory 114 and the HDD 104.

Specifically, in a case where the alteration detection setting is changed, the UI control component 206, which is the app 213, additionally performs processing of storing the content of the setting change as the alteration detection setting 311 in a storage region in the flash memory 114. For the other parts of the processing related to the alteration detection setting, the UI control component 206, which is the app 213, performs similar processing to that in the comparative example. Specifically, the UI control component 206 stores the alteration detection setting as part of the setting value 309 in a storage region in the HDD 104, and performs display processing referring to the setting value 309 in the HDD 104. Thus, the app 213 is capable of handling the setting related to the alteration detection with the same access interface as that for other setting values. Also, no special processing has to be performed in the case of performing back up and restoration.

<Flowchart of Alteration Detection>

FIGS. 6A and 6B are a flowchart explaining processing performed while the contents of the alteration detection setting 311 and the setting value 309 are referred to. The CPU 101 of the multi-function peripheral 100 performs the series of processes shown in the flowchart in FIGS. 6A and 6B by deploying pieces of program code stored in the flash memory 114 and the HDD 104 into the RAM and executing them. Specifically, the CPU 101 performs the series of processes by executing the program code of each of the BIOS 210, the loader 211, the kernel 212, and the app 213. Also, the CPU 101 performs some of the processes shown in FIGS. 6A and 6B by executing the program code of the boot program 209, which is stored in the ROM 102.

Upon powering on the multi-function peripheral 100, the CPU 101 directly reads out the boot program 209 from the ROM 102 and executes the boot program 209. Upon execution of the boot program 209, in S601, the BIOS alteration detection processing component 201 loads the BIOS 210, the loader verification public key 303, and the BIOS signature 302 into the CPU 101 from the flash memory 114. The BIOS alteration detection processing component 201 then performs a verification on the BIOS signature 302 by using the BIOS verification public key 300, and determines whether the BIOS signature 302 is successfully verified.

If the signature fails to be verified, the processing proceeds to S613. Then in S613, the BIOS alteration detection processing component 201 displays an error message on the console panel 110, and ends the processing. On the other hand, if the signature is successfully verified, the BIOS alteration detection processing component 201 ends its alteration detection processing, and the processing proceeds to S602. Then in S602, the boot program 209 starts the BIOS 210.

After the BIOS 210 is started, the BIOS 210 performs start processing such as hardware initialization in accordance with the BIOS setting 310. Then in S603, the loader alteration detection processing component 203, included in the BIOS 210, obtains the alteration detection setting 311 in the flash memory 114 and determines whether the alteration detection setting 311 is a setting indicating an enabled status.

If determining that the alteration detection setting 311 is the setting indicating the disabled status, the loader alteration detection processing component 203 ends its alteration detection processing, and the processing proceeds to S605. In S605, the BIOS 210 starts the loader 211 "with no alteration detection processing", i.e., without performing a verification on the loader 211. Specifically, the BIOS 210 loads the loader 211 into the RAM 103 from the HDD 104 and starts the loader 211. The loader 211 is configured to start the kernel 212 without performing alteration detection processing in the case where the loader 211 is started "with no alteration detection processing". After S605, the processing proceeds to S608. In S608, the loader 211 starts the kernel 212 without performing alteration detection processing. Specifically, the loader 211 loads the kernel 212 into the RAM 103 from the HDD 104 and starts the kernel 212.

On the other hand, if it is determined in S603 that the alteration detection setting 311 is the setting indicating the enabled status, the processing proceeds to S604. In S604, the loader alteration detection processing component 203, included in the BIOS 210, loads the loader 211, the kernel verification public key 305, and the loader signature 304 into the RAM 103 from the HDD 104. The loader alteration detection processing component 203 then performs a verification on the loader signature 304 by using the loader verification public key 303, and determines whether the loader signature 304 is successfully verified.

If the loader signature 304 fails to be verified in S604, the processing proceeds to S613. In S613, the loader alteration detection processing component 203 displays an error message on the console panel 110, and ends the processing.

On the other hand, if the loader signature 304 is successfully verified in S604, the processing proceeds to S606. In S606, the processing by the loader alteration detection processing component 203 is ended, and the BIOS 210 starts the loader 211 "with alteration detection processing". The loader 211 is configured to start the kernel 212 after performing alteration detection processing in the case where the loader 211 is started "with alteration detection processing". Thus, in the case where the loader 211 has been started "with alteration detection processing", the kernel alteration detection processing component 204, included in the loader 211, loads the kernel 212, the app verification public key 307, and the kernel signature 306 into the RAM 103 from the HDD 104 in S606. In S607, the kernel alteration detection processing component 204 performs a verification on the kernel signature 306 by using the kernel verification public key 305, and determines whether the kernel signature 306 is successfully verified.

If the kernel signature 306 fails to be verified in S607, the processing proceeds to S613. In S613, the kernel alteration detection processing component 204 displays an error message on the console panel 110, and ends the processing.

On the other hand, if the kernel signature 306 is successfully verified in S607, the processing proceeds to S608. In S608, the processing by the kernel alteration detection processing component 204 is ended, and the loader 211 starts the kernel 212.

As described above, there are two patterns to start the kernel in S608. The starting of the kernel is switched between the two patterns on the basis of the alteration detection setting 311. Specifically, in the case where the alteration detection setting 311 is the setting indicating the disabled status, the loader 211 and the kernel 212 are started with no alteration detection processing. In the case where the alteration detection setting 311 is the setting indicating the enabled status, the loader 211 and the kernel 212 are started after alteration detection processing. In the present embodiment, the alteration detection setting 311 is stored in a storage region referable by the BIOS 210. For this reason, the BIOS 210 and the loader 211 can switch between executing and not executing the alteration detection without referring to the setting value 309, which is stored in the HDD 104.

The processing in FIG. 6B will be continued. After the kernel 212 is started, the kernel 212 performs an initialization process such as loading various drivers. By loading the various drivers, the setting value 309 in the HDD 104 becomes referable. In S609, the app alteration detection processing component 205, included in the kernel 212, is started. Then, the app alteration detection processing component 205 obtains the alteration detection setting from the setting value 309 in the HDD 104 and also obtains the alteration detection setting 311 from the flash memory 114. The app alteration detection processing component 205 then compares the alteration detection settings obtained from the HDD 104 and the flash memory 114 with each other. As explained in FIG. 5, the alteration detection setting 311 in the flash memory 114 and the setting value in the HDD 104 are synchronized with each other. Thus, as a rule, the alteration detection setting 311 in the flash memory 114 and the setting value in the HDD 104 are values indicating the same setting. However, there is a case where the alteration detection setting 311 and the setting value are not synchronized with each other if any of the devices (HDD 104 and flash memory 114) is replaced due to a failure or the like. The comparison process in S609 is a process performed in consideration of this possible absence of synchronization. Details will be described later.

If the alteration detection settings obtained from the HDD 104 and the flash memory 114 in S609 are determined to match each other, the processing proceeds to S610. In S610, the app alteration detection processing component 205 determines whether each alteration detection setting is the setting indicating the enabled status.

If the alteration detection setting is determined to be the setting indicating the disabled status in S610, the processing proceeds to S612. In S612, the processing by the app alteration detection processing component 205 is ended, and the kernel 212 starts the app 213. Specifically, the kernel 212 loads the app 213 into the RAM 103 from the HDD 104 and starts the app 213 without performing alteration detection processing. Then, the series of processes ends.

On the other hand, if each alteration detection setting is determined to be the setting indicating the enabled status in S610, the processing proceeds to S611. In S611, the app alteration detection processing component 205 loads the app 213 and the app signature 308 into the RAM 103 from the HDD 104. Then, the app alteration detection processing component 205 performs a verification on the app signature 308 by using the app verification public key 307, and determines whether the app signature 308 is successfully verified.

If the app signature 308 fails to be verified, the processing proceeds to S613. In S613, the app alteration detection processing component 205 displays an error message on the console panel 110, and ends the processing.

On the other hand, if the app signature 308 is successfully verified in S610, the processing proceeds to S612. In S612, the kernel 212 starts the app 213 in the manner described above. Then, the series of processes ends.

Next, a description will be given of the processing in the case where the alteration detection settings obtained from the HDD 104 and the flash memory 114 are determined to be not matching each other in S609. If the alteration detection settings are determined to be not matching each other in S609, the processing proceeds to S614. In S614, the app alteration detection processing component 205 determines whether the alteration detection setting 311 in the flash memory 114 is the setting indicating the enabled status and the setting value 309 in the HDD 104 is the setting indicating the disabled status.

If the alteration detection setting 311 in the flash memory 114 is the setting indicating the enabled status and the setting value 309 in the HDD 104 is the setting indicating the disabled status, the processing proceeds to S615. In S615, the app alteration detection processing component 205 updates the setting value 309 in the HDD 104 to the setting indicating the enabled status. The processing then proceeds to S611. In S611, the app alteration detection processing component 205 performs the process of performing a verification on the app signature 308 in the above-described manner.

The series of processes in S614 and S615 are processes performed in a case where the HDD 104 has been replaced due to a failure or the like in the state where the alteration detection setting 311 in the flash memory 114 and the setting value 309 in the HDD 104 are synchronized with each other as the setting indicating the enabled status. Specifically, the series of processes in S614 and S615 are processes needed in a case where the setting value 309 has become the setting indicating that the alteration detection setting is disabled due to replacement of the HDD 104. Without performing these processes, only the BIOS 210 to the kernel 212 perform alteration detection processing. In other words, a verification is not performed on the app 213. This results in an operation under a setting different from the setting before the replacement of the HDD 104 and lowers the security. Further, in a case where a user refers to the alteration detection setting on the console panel 110, the setting value 309 is the setting indicating that the alteration detection is disabled, but alteration detection processing is actually performed in some part. Specifically, the BIOS 210 to the kernel 212 perform alteration detection processing. This causes an inconsistency between the alteration detection setting referred to on the console panel 110 and the actual operation. Hence, the user does not receive the right information on the operation of the multi-function peripheral 100. Performing the series of processes in S614 and S615 prevents this situation.

If the alteration detection setting 311 in the flash memory 114 is the setting indicating the disabled status and the setting value 309 in the HDD 104 is the setting indicating the enabled status in S614, the processing proceeds to S616. In S616, the app alteration detection processing component 205 updates the alteration detection setting 311 in the flash memory 114 to the setting indicating the enabled status. The processing then proceeds to S617. In S617, the app alteration detection processing component 205 restarts the multi-function peripheral 100. Then, the series of processes ends.

Specifically, the series of processes in S614, S616, and S617 are processes needed in a case where the alteration detection setting 311 has become the setting indicating the disabled status as a result of replacement of the flash memory 104 due to a failure or the like. Without these processes, in a case where a user refers to the alteration detection setting on the console panel 110, the alteration detection setting is displayed as enabled, but only the app 213 performs alteration detection processing. Accordingly, the security is lowered. There is also an inconsistency between the alteration detection setting referred to on the console panel 110 and the actual operation. Hence, the user does not receive the right information on the operation of the multi-function peripheral 100. By performing the series of processes in S614, S616, and S617, the multi-function peripheral 100 is restarted with the alteration detection setting 311 as the setting indicating the enabled status. Note that the case where the processing has proceeded to S616 represents a state where the processing is being performed with the alteration detection setting 311 in the flash memory 114 as the setting indicating the disabled status. This means that the loader 211 and the kernel 212 have been started with no alteration detection processing. S616 and S617 change the alteration detection setting 311 in the flash memory 114 to the setting indicating the enabled status, and then the processing in the flowchart in FIGS. 6A and 6B is performed again. Hence, the loader 211 and the kernel 212 are started with alteration detection processing.

As described above, in the present embodiment, the setting related to alteration detection processing is stored in a first region referable by the BIOS 210 upon its start up and in a second region not referable by the BIOS 210 upon its start up. The first region and the second region are regions referable from the app 213. Also, the setting in the first region and the setting in the second region are synchronized with each other by the app 213. By storing the setting related to the alteration detection in this manner, it is possible to switch between executing and not executing the alteration detection processing. Also, it is possible to shorten the start time of an information processing apparatus having an alteration detection function by disabling the alteration detection function.

Also, besides the case where the setting for the alteration detection processing is stored in the synchronized manner, the app 213 is capable of handling the setting for the alteration detection processing in the same manner as other setting values. This makes the management easier. Also, in the present embodiment, processing is performed while the setting for the alteration detection processing is stored in two locations, namely the HDD 104 and the flash memory 114, and synchronized with each other. Hence, in a case where an attacker attempts to fraudulently rewrite settings to turn off the alteration detection setting, the attacker must simultaneously rewrite the settings in two locations. Hence, the effect of raising the difficulty in attacking is also achieved.

OTHER EMBODIMENTS

The above embodiment has been described by taking a method using a public key and a signature as an example of the alteration detection method, but other methods may be used. Also, the above embodiment has been described on the assumption that the HDD 104 and the flash memory 114 are present as the storage devices, but different storage devices may be used. Any storage devices may be used as long as the configuration includes a plurality of storage devices that can be a storage device referable by a boot program that operates in starting of the information processing apparatus and a storage device not referable by the boot program.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-170613, filed Sep. 12, 2018, which is hereby incorporated by reference wherein in its entirety.

What is claimed is:

1. An information processing apparatus that performs alteration detection processing on every occasion of starting a program, comprising:
   at least one processor;
   a memory that stores a program which, when executed by the at least one processor, causes the at least one processor to function as:
      a writing component capable of writing a setting indicating whether or not to perform the alteration detection processing to a first region referable by a first program which performs the alteration detection processing on another program before performing the alteration detection processing on another program by a second program and to a second region referable by the second program which performs the alteration detection processing and is not referable by the first program at a point when the first program is started, and
      a selection component configured to allow a user to select the setting indicating whether or not to execute the alteration detection processing,
   wherein the writing component writes the settings indicating whether or not to perform the alteration detection processing, which are selected by the user, in both the first region and the second region,
   wherein the first program performs the alteration detection processing in accordance with the setting indicating whether or not to perform the alteration detection processing written in the first region, and
   the second program performs the alteration detection processing in accordance with the setting indicating whether or not to perform the alteration detection processing written in the second region.

2. The information processing apparatus according to claim 1, wherein the first region and the second region are storage regions in different storage devices.

3. The information processing apparatus according to claim 1, wherein
   the first region is a region in a storage device storing the first program, and
   the second region is a region in a storage device storing the second program.

4. The information processing apparatus according to claim 1, wherein
   the first program is a BIOS, and
   the second program is a program involving a process of enabling a driver capable of referring to the second region.

5. The information processing apparatus according to claim 1, wherein the writing component and the selection component are implemented to function by a third program started by the second program.

6. The information processing apparatus according to claim 1, wherein in a case where the setting in the first region and the setting in the second region do not match each other, the second program performs a process of matching the setting in the first region and the setting in the second region with each other such that the settings are both a setting for performing the alteration detection processing.

7. The information processing apparatus according to claim 6, wherein
   in a case where the setting in the first region is a setting for performing the alteration detection processing and the setting in the second region is a setting for not performing the alteration detection processing,
   the second program changes the setting in the second region to the setting for performing the alteration detection processing, and then performs the alteration detection processing in accordance with the setting written in the second region.

8. The information processing apparatus according to claim 6, wherein
   in a case where the setting in the first region is a setting for not performing the alteration detection processing and the setting in the second region is a setting for performing the alteration detection processing,
   the second program changes the setting in the first region to the setting for performing the alteration detection processing, and then performs a process of restarting the information processing apparatus.

9. A method of controlling an information processing apparatus that performs alteration detection processing on every occasion of starting a program, comprising:
   a) writing a setting indicating whether or not to perform the alteration detection processing to a first region referable by a first program that performs the alteration detection processing on another program before performing the alteration detection processing on another program by a second program and to a second region referable by the second program that performs the alteration detection processing and is not referable by the first program at a point when the first program is started;
   b) selecting the setting indicating whether or not to execute the alteration detection processing by a user; and
   c) writing the settings indicating whether or not to perform the alteration detection processing, which are selected by the user, in both the first region and the second region,
   wherein the first program performs the alteration detection processing in accordance with the setting indicating whether or not to perform the alteration detection processing written in the first region, and
   the second program performs the alteration detection processing in accordance with the setting indicating whether or not to perform the alteration detection processing written in the second region.

10. A non-transitory computer readable storage medium storing a control program which causes a computer to perform:
   a) writing a setting indicating whether or not to perform alteration detection processing to a first region referable by a first program that performs the alteration detection processing on another program before performing the alteration detection processing on another program by a second program and to a second region referable by the second program that performs the alteration detection processing and is not referable by the first program at a point when the first program is started;
   b) selecting the setting indicating whether or not to execute the alteration detection processing by a user; and
   c) writing the settings indicating whether or not to perform the alteration detection processing, which are selected by the user, in both the first region and the second region,
   wherein the first program performs the alteration detection processing in accordance with the setting indicating whether or not to perform the alteration detection processing written in the first region, and the second program performs the alteration detection processing in accordance with the setting indicating whether or not to perform the alteration detection processing written in the second region.

* * * * *